United States Patent
Pathak et al.

(10) Patent No.: US 12,473,608 B2
(45) Date of Patent: Nov. 18, 2025

(54) STEEL COMPOSITION IN ACCORDANCE WITH API 5L PSL-2 SPECIFICATION FOR X-65 GRADE HAVING ENHANCED HYDROGEN INDUCED CRACKING (HIC) RESISTANCE, AND METHOD OF MANUFACTURING THE STEEL THEREOF

(71) Applicant: TATA STEEL LIMITED, Jharkhand (IN)

(72) Inventors: Prashant Pathak, Jharkhand (IN); Saurabh Kundu, Jharkhand (IN); Basudev Bhattacharya, Jharkhand (IN); Subrata Mukherjee, Jharkhand (IN); Amar Nath Bhagat, Jharkhand (IN); Hrishikesh Shastri, Jharkhand (IN); Badirujjaman Syed, Jharkhand (IN)

(73) Assignee: TATA STEEL LIMITED, Jharkhand (IN)

( * ) Notice: Subject to any disclaimer, the term of this patent is extended or adjusted under 35 U.S.C. 154(b) by 568 days.

(21) Appl. No.: 16/982,422

(22) PCT Filed: Oct. 1, 2018

(86) PCT No.: PCT/IB2018/057606
§ 371 (c)(1),
(2) Date: Sep. 18, 2020

(87) PCT Pub. No.: WO2019/180499
PCT Pub. Date: Sep. 26, 2019

(65) Prior Publication Data
US 2021/0054473 A1    Feb. 25, 2021

(30) Foreign Application Priority Data
Mar. 19, 2018   (IN) .............................. 201831010054

(51) Int. Cl.
*C21D 9/08* (2006.01)
*C21D 6/00* (2006.01)
(Continued)

(52) U.S. Cl.
CPC ............. *C21D 9/085* (2013.01); *C21D 6/005* (2013.01); *C21D 6/008* (2013.01); *C21D 8/105* (2013.01);
(Continued)

(58) Field of Classification Search
None
See application file for complete search history.

(56) References Cited

U.S. PATENT DOCUMENTS 9,062,356 B2 *   6/2015   Yokoi ................. C21D 8/0226

FOREIGN PATENT DOCUMENTS

| CN | 100359035 C | * | 1/2008 |
| CN | 102373383 A | * | 3/2012 |

(Continued)

OTHER PUBLICATIONS

Machine translation of CN102373383A. (Year: 2012).*
(Continued)

*Primary Examiner* — Xiaowei Su
(74) *Attorney, Agent, or Firm* — HSML P.C.

(57) ABSTRACT

The present disclosure relates to designing of steel composition for line pipe steel to be used for sour environment. The developed steel of the present disclosure exhibits enhanced tensile properties in accordance with API 5L PSL-2 specification for X-65 grade steel, along with superior hydrogen induced cracking resistance with crack length ratio (CLR) of less than 10%, crack thickness ratio (CTR) of less than 5%, crack sensitivity ratio (CSR) of less than 2%. The developed steel is designed such that it is readily hot/cold formed and welded to form linepipe tubes to be used for the transpor-
(Continued)

Figure 1:
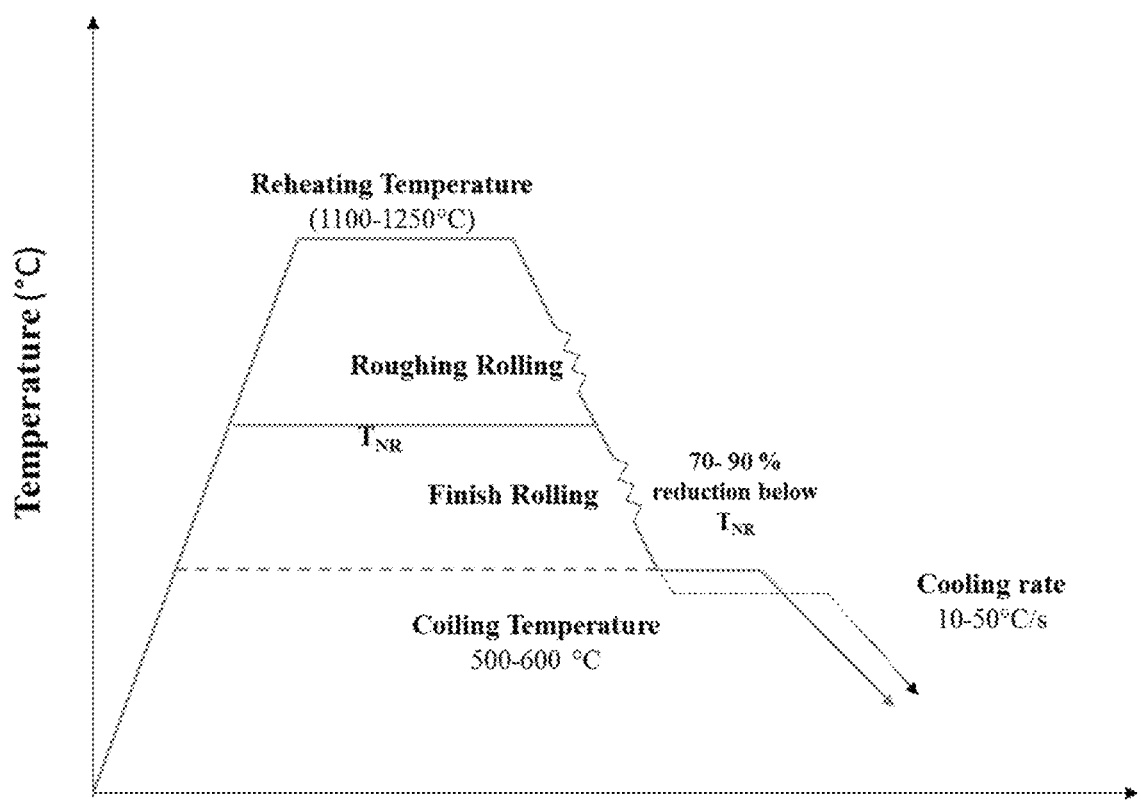

tation of natural gas or crude oil, especially of sour grade. The present disclosure also provide a method of manufacturing the said steel having the composition of the present disclosure.

13 Claims, 5 Drawing Sheets

(51) Int. Cl.
  *C21D 8/10*    (2006.01)
  *C22C 38/00*   (2006.01)
  *C22C 38/02*   (2006.01)
  *C22C 38/04*   (2006.01)
  *C22C 38/06*   (2006.01)
  *C22C 38/12*   (2006.01)
  *C22C 38/14*   (2006.01)

(52) U.S. Cl.
  CPC .......... *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C21D 2211/002* (2013.01); *C21D 2211/005* (2013.01)

(56) References Cited

FOREIGN PATENT DOCUMENTS

| | | | |
|---|---|---|---|
| CN | 105543690 A | * | 5/2016 |
| EP | 1568792 A1 | | 8/2005 |
| EP | 2133441 A1 | | 12/2009 |
| EP | 2295615 A1 | | 3/2011 |
| EP | 27828029 A1 | | 5/2014 |
| EP | 2837708 A1 | | 2/2015 |
| JP | 2006274338 A | | 10/2006 |
| JP | 2013014844 A | * | 1/2013 |

OTHER PUBLICATIONS

Machine translation of CN105543690A. (Year: 2016).*
Machine translation of CN 100359035C. (Year: 2008).*
Machine translation of JP 2013-014844A. (Year: 2013).*
International Search Report and Written Opinion, International Patent Application No. PCT/IB2018/057606, Dec. 20, 2018 (10 pages).

* cited by examiner

“STEEL COMPOSITION IN ACCORDANCE WITH API 5L PSL-2 SPECIFICATION FOR X-65 GRADE HAVING ENHANCED HYDROGEN INDUCED CRACKING (HIC) RESISTANCE, AND METHOD OF MANUFACTURING THE STEEL THEREOF”

TECHNICAL FIELD

The present disclosure relates to designing of linepipe steel grade conforming to API 5L PSL-2 X65 specification having excellent hydrogen induced cracking (HIC) resistance and superior low temperature toughness, formability and weldability. More particularly, the present disclosure provides a steel composition comprising Carbon (C), Manganese (Mn), Niobium (Nb), Titanium (Ti), Aluminium (Al), Silicon (Si), Nitrogen (N), Sulphur (S) and Phosphorus (P) at specific concentrations, that ensures that the resulting steel exhibits superior HIC resistance, enhanced tensile properties along with specific ferrite potential and carbon equivalence. The said HIC resistant steel is accordingly tough enough to transport sour grade of crude reserves. The present disclosure also provides a method for manufacturing the said steel of the present disclosure, and the specifically controlled conditions therein allow the steel to be manufactured such that it showcases the desired HIC resistant properties and is in accordance with the said specification.

BACKGROUND OF THE DISCLOSURE

The transportation of petroleum and the natural gas over the longer distances through pipelines is the most effective and economical mode of fuel transportation. The gradual depletion of non-sour grade of crude reserves demands the utilization of sour grade (sulphur content >0.5%) through advanced refining techniques. Accordingly, their transportation requires the line pipe steel to be of grades with superior resistance to hydrogen induced cracking (HIC) caused by the presence of $H_2S$ in the crude oil coupled with the high operating pressure employed to increase the efficiency of fuel transportation.

Prior arts suggest methods by which HIC properties in high strength linepipe steel may be improved, one of them being through substantial addition of copper (Cu) in the steel. The Cu content of up to 1% by weight is suggested in the steel composition. However, such a high level of Cu in the steel increases the susceptibility of steel to hot shortness, which may cause the cracking of steel surface while hot forming/rolling of the steel slab. While Nickle (Ni) can be added to overcome the issue of hot shortness, it's addition beyond 0.5% not only impacts the weldabilty of steel but significantly increases the cost of the steel as well. Other prior arts suggest melting and refining of steel to limit the number of inclusions for improving the HIC properties of line pipe steel.

Further, some prior arts suggest compositions comprising Molybdenum (Mo) along with Titanium (Ti), which allows formation of Ti—Mo precipitates in the steel microstructure, which are used to improve the HIC properties of steel. However, these compositions contain high concentration of Manganese (Mn) which leads to the Mn segregation which promotes microstructural banding in the steel microstructure. This causes the microstructural inhomogeneity and makes the steel prone to the formation of harder phase at the mid thickness of steel grade. The presence of harder phase localized in the segregated regions is known to make steel susceptible to hydrogen induced cracking.

In light of the above discussed prior art, there is a need of a steel composition and the microstructure which overcomes the limitations of prior art and exhibits superior resistance to hydrogen induced cracking, coupled with superior formability and weldability.

SUMMARY OF THE DISCLOSURE

The present disclosure relates to a steel made of a composition which provides high resistance to hydrogen induced cracking (HIC), is non-peritectic and has enhanced strength and toughness. The said composition comprises Carbon (C) at a concentration ranging from about 0.02 wt % to about 0.06 wt %; Manganese (Mn) at a concentration ranging from about 0.7 wt % to about 1.3 wt %; Niobium (Nb) at a concentration ranging from about 0.06 wt % to about 0.10 wt %; Titanium (Ti) at a concentration ranging from about 0.015 wt % to about 0.025 wt %; Aluminium (Al) at a concentration ranging from about 0.03 wt % to about 0.10 wt %; Silicon (Si) at a concentration ranging from about 0.1 wt % to about 0.5 wt %; Nitrogen (N) at a concentration ranging from about 0.0001 wt % to about 0.0060 wt %; Sulphur (S) at a concentration ranging from about 0.0001 wt % to about 0.0020 wt %; and Phosphorus (P) at a concentration ranging from about 0.0001 wt % to about 0.015 wt %.

In embodiments of the present disclosure, the resulting steel possesses superior resistance to hydrogen induced cracking by exhibiting crack length ratio (CLR) of less than 10%, crack thickness ratio (CTR) of less than 5%, and crack sensitivity ratio (CSR) of less than 2%.

In further embodiments of the present disclosure, the ferrite potential of said composition is less than 0.85 or more than 1.05, thereby making the resultant steel non-peritectic; whereas the carbon equivalence of the composition is less than 0.35, ensuring that the steel exhibits excellent weldability.

In further embodiments of the present disclosure, the steel having the said composition has polygonal ferrite and bainitic ferrite microstructure; and possesses tensile properties in accordance with API 5L PSL-2 X65 specification.

In further embodiments of the present disclosure, the steel of the present disclosure is designed such that it is readily hot/cold formed, fire resistant and is welded to form linepipe tubes to be used for the transportation of natural gas or crude oil, especially of sour grade.

The present disclosure also provides a method for manufacturing steel having composition as described above, wherein said method involves casting of the composition in steel slab, hot rolling of the steel slab at specific conditions, and controlled cooling of the hot rolled steel sheet to obtain the steel.

In embodiments of the present disclosure, recrystallization stop temperature ($T_{NR}$) with finish hot rolling temperature (FRT), along with the coiling temperature are critical to arrive at the steel of the present disclosure.

BRIEF DESCRIPTION OF THE ACCOMPANYING DRAWINGS

FIG. 1 provides a schematic illustrating the designed thermo-mechanical processing for the manufacturing of API 5L PSL-2 X65 hot rolled steel grade for welded steel pipe to be used for sour service application.

Figure 2:
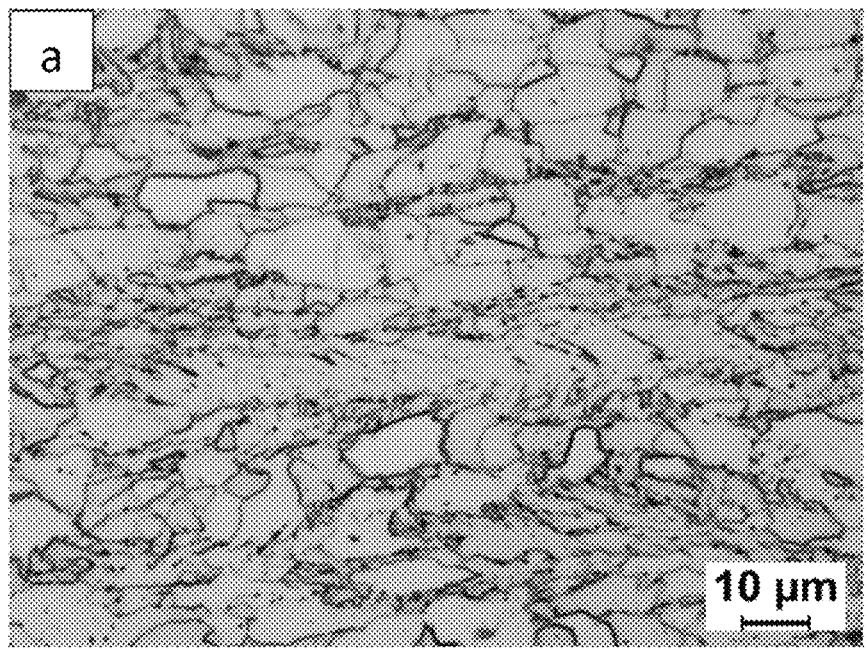
Figure 2:
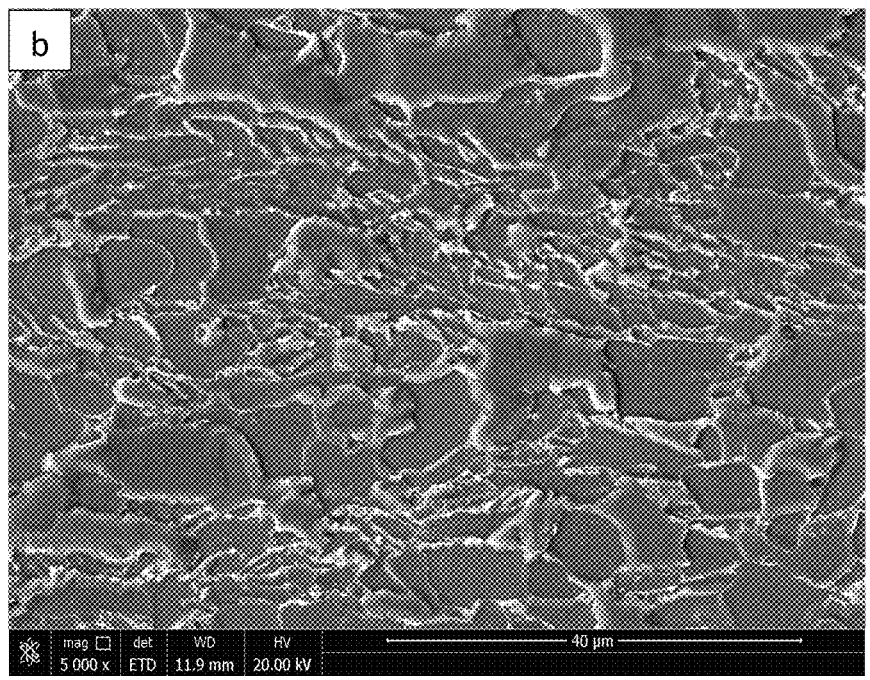

FIG. 2 provides (a) optical and (b) SEM micrograph showing the ferrite-bainite microstructure of steel coiled at 500° C.

Figure 3:
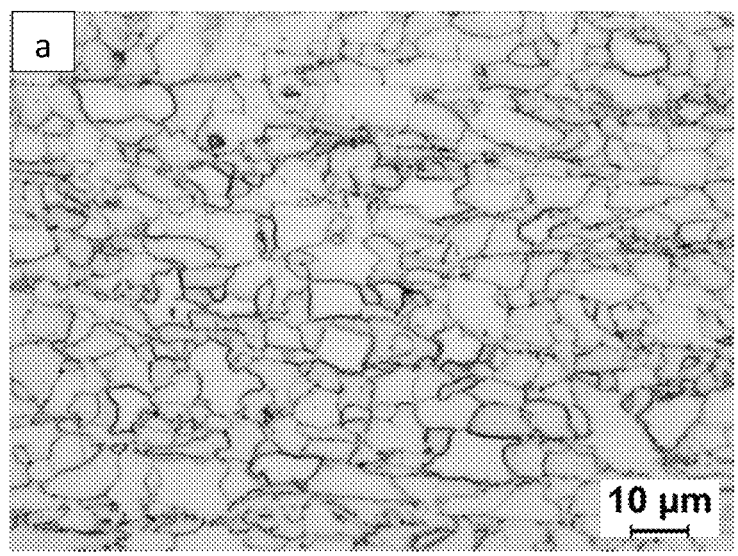
Figure 3:
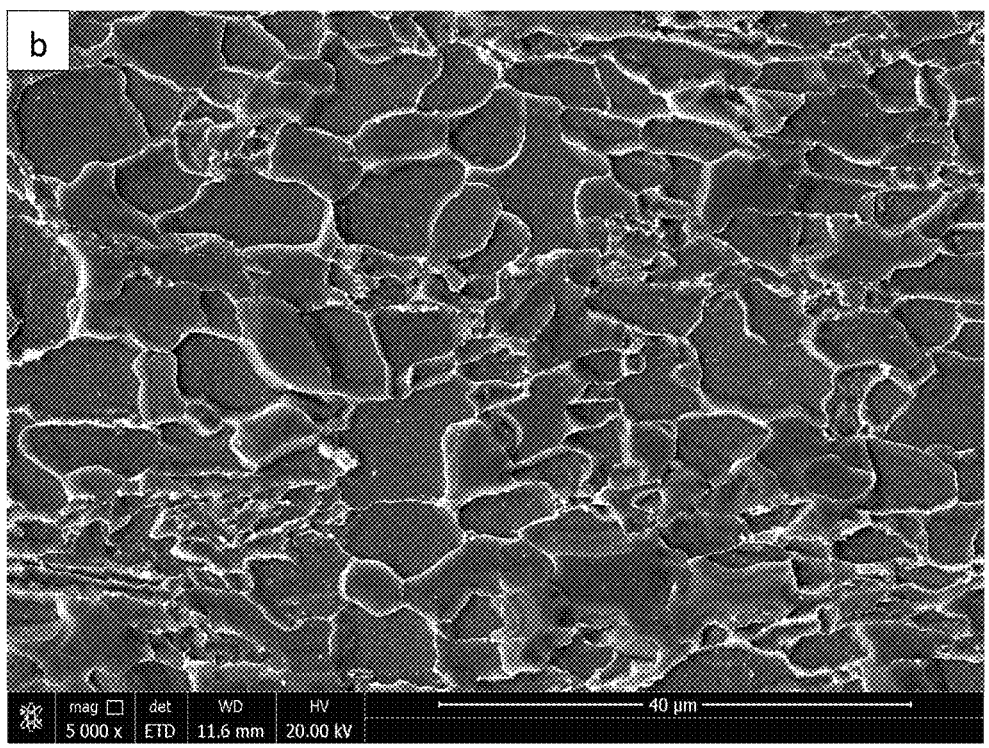

FIG. 3 provides (a) optical and (b) SEM micrograph showing predominantly polygonal ferrite with acicular or bainitic ferrite microstructure of steel coiled at 600° C.

Figure 4:
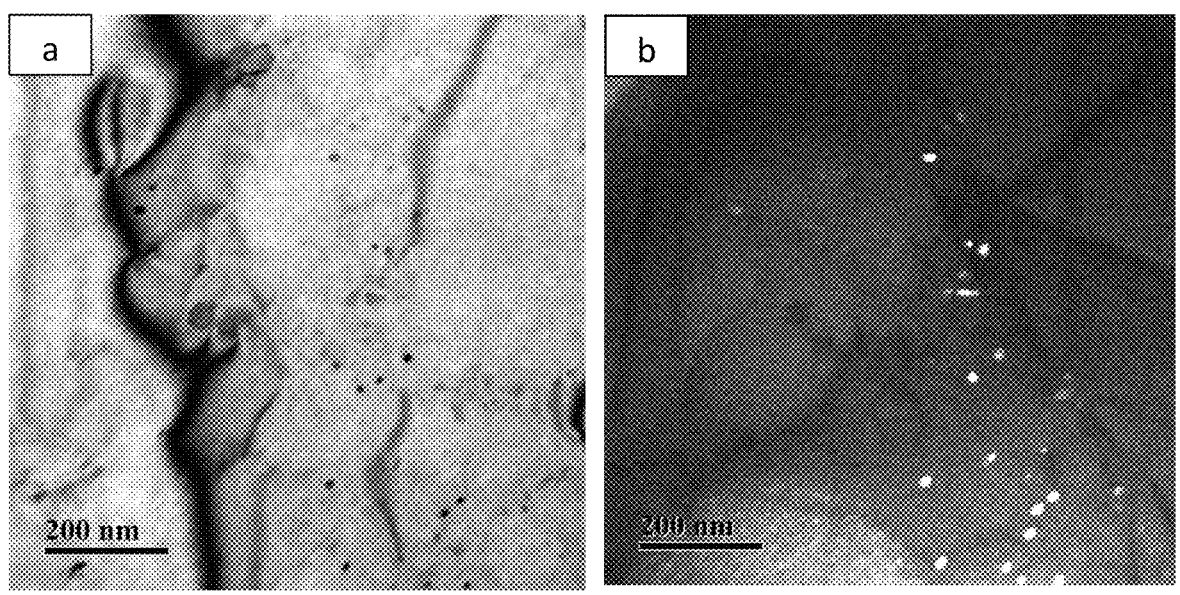

FIG. 4 provides bright and dark field TEM micrographs revealing the dispersion of fine precipitates of niobium carbide/carbonitride for the steel coiled at 600° C.

Figure 5:
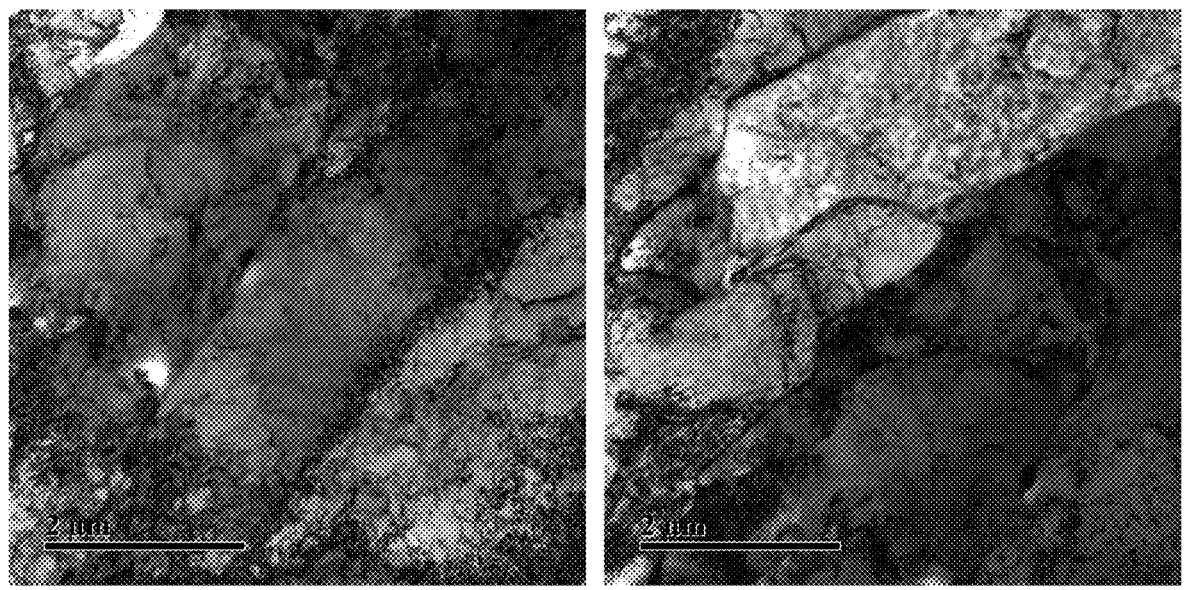

FIG. 5 provides bright field TEM micrographs showing the fine bainitic ferrite/acicular ferrite microstructure for the steel coiled at 500° C.

Figure 6:
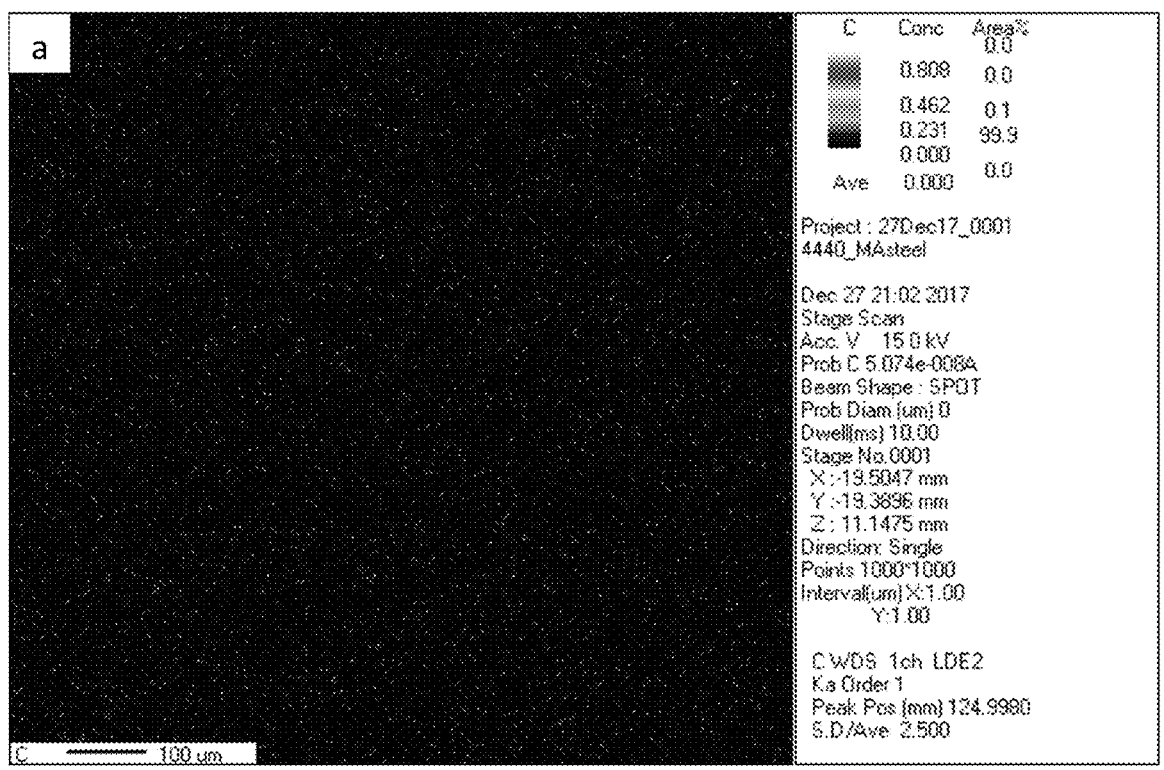
Figure 6:
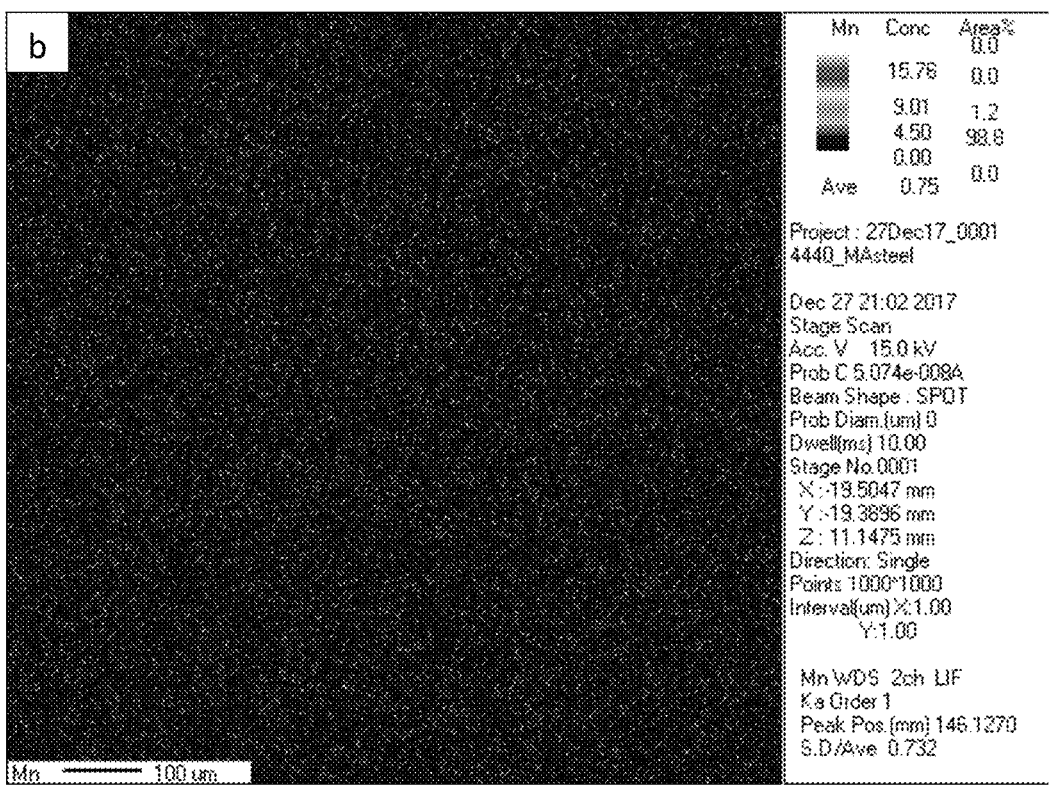

FIG. 6 highlights the uniform distribution of (a) carbon and (b) manganese, in the mid thickness region of hot rolled steel of the present disclosure.

DETAILED DESCRIPTION

In view of the problems of the prior art highlighted above, the present disclosure aims to provide a steel made of a composition which provides high resistance to hydrogen induced cracking (HIC), is non-peritectic and has enhanced strength and toughness. The steel having the said composition must also conform to API 5L PSL-2 X65 specification (API—American Petroleum Institute/PSL—Product Standard Level). Accordingly, detailed research is carried out to study the effect and role of alloying elements on the microstructure development, mechanical properties (tensile, hardness, toughness, etc.), segregation and HIC properties of steel. The steel composition and the processing parameters (e.g. deformation schedule, finish rolling temperature (FRT), coiling temperature (CT), cooling rate at run out table (ROT), etc.) were designed and optimized by carrying out thermo-mechanical simulations followed by the pilot scale trials.

An object of the present disclosure is therefore to propose a micro alloyed steel composition and thermo-mechanical processing to roll out hot rolled sheets/plates which exhibits superior HIC resistance and conforms to the properties laid down for API 5L PSL-2 X-65 specification.

As a result, the present disclosure provides a steel composition comprising Carbon (C) at a concentration ranging from about 0.02 wt % to about 0.06 wt %; Manganese (Mn) at a concentration ranging from about 0.7 wt % to about 1.3 wt %; Niobium (Nb) at a concentration ranging from about 0.06 wt % to about 0.10 wt %; Titanium (Ti) at a concentration ranging from about 0.015 wt % to about 0.025 wt %; Aluminium (Al) at a concentration ranging from about 0.03 wt % to about 0.10 wt %; Silicon (Si) at a concentration ranging from about 0.1 wt % to about 0.5 wt %; Nitrogen (N) at a concentration ranging from about 0.0001 wt % to about 0.0060 wt %; Sulphur (S) at a concentration ranging from about 0.0001 wt % to about 0.0020 wt %; and Phosphorus (P) at a concentration ranging from about 0.0001 wt % to about 0.015 wt %. The said composition may also comprise Calcium (Ca) at a concentration ranging from about 0.0020 to about 0.0050 wt %.

This steel composition of the present disclosure is designed to restrict the segregation of elements like Carbon and Manganese which promotes microstructural banding in mid-section thickness of hot rolled steels. Lower Carbon and Manganese content in comparison to the conventional API-X-65 was used in conjunction with accelerated cooling at ROT to produce segregation free hot rolled steel with superior HIC properties. As a result, due to the concentration of the elements and the manner in which the composition is designed, there is a uniform distribution of carbon and manganese in the mid thickness region of hot rolled steel.

The said composition allows the resulting steel to possess superior resistance to hydrogen induced cracking. This performance of steel against HIC is expressed in terms of three parameters—crack length ratio (CLR), crack thickness ratio (CTR), and crack sensitivity ratio (CSR) when subjected to the HIC testing as per NACE standard TM0284-2005 (NACE—National Association of Corrosion Engineers). The CLR, CTR and CSR are defined by the following equations:

$$\text{Crack Length Ratio } (CLR) = \frac{\sum a}{w} * 100\%$$

$$\text{Crack Thickness Ratio } (CTR) = \frac{\sum b}{T} * 100\%$$

$$\text{Crack Sensitivity Ratio } (CSR) = \frac{\sum (a*b)}{\sum (w*T)} * 100\%$$

In all embodiments of the present disclosure, the composition herein allows the resulting steel to possess superior resistance to hydrogen induced cracking by exhibiting crack length ratio (CLR) of less than 10%, crack thickness ratio (CTR) of less than 5%, and crack sensitivity ratio (CSR) of less than 2% when subjected to the HIC testing as per NACE standard TM0284-2005. The said composition also exhibits ferrite potential of less than 0.85 or more than 1.05 because of which, the said steel is non-peritectic.

The said composition of the present disclosure is specifically designed to ensure that the concentrations of the constituent elements provide optimum desired results. Thus, it is important to understand the role of each of the critical elements with respect to their concentrations as provided below:

Carbon: The preferable range for the carbon in the steel is about 0.02 wt % to about 0.04 wt %. C is added to derive the strength in steel through solid solution strengthening, second phase formation along with the formation of precipitates in the form of carbides/carbonitrides. However, in the present disclosure the carbon content is limited to 0.06% to limit the segregation of carbon in steel which causes the formation of martensite or martensite/austenite (MA) constituents in the steel microstructure. The presence of martensite and MA constituents is detrimental to HIC resistance of steel. Also, the increased carbon content decreases the toughness and weldabilty of steel. In addition, the lower carbon content also allows the designing of non-peritectic steel composition.

Manganese: The preferable range for the Mn in the steel is about 0.7 wt % to about 1.0 wt %. Mn, apart from imparting solid solution strengthening, also lowers the austenite to ferrite transformation temperature and helps in refining the ferrite grain size. Manganese at higher level enhances the centerline segregation during the process of continuous casting. Moreover, it leads to the higher number of MnS inclusions which are detrimental to hydrogen induced cracking resistance. Higher level of manganese in steel also increases the carbon equivalence and impairs the weldability of steel.

Silicon: The preferable range for the Si in the steel is about 0.20 wt % to about 0.40 wt %. Silicon imparts the solid solution strengthening effect like Mn. Si is also being employed as a deoxidizing element. However, in order to prevent the formation of surface scales, the Si content in the steel is restricted to a maximum content of 0.5%. Also, higher Si content impairs the weldability of the steel by increasing carbon equivalence.

Niobium: The preferable range for the Nb in the steel is about 0.07 wt % to about 0.08 wt %. Nb in steel helps in the grain refinement because of its solute drag effect and allows to lower the carbon content of the steel. Niobium significantly increases the recrystallization stop temperatures and allows the higher amount of deformation below recrystallization stop temperature ($T_{NR}$) during the hot rolling of the steel. This allows significant reduction in grain size and remarkably increases the toughness of steel. The role of Niobium in the present disclosure is also extended to increase the hardenability of austenite to form the bainitic ferrite or acicular ferrite at relatively lower cooling rates. However, Niobium content in excess of 0.10% can significantly increase the mill load which may drastically reduce the life of the rolls in the rolling mill or in some cases it may be beyond the capacities of the rolling mills.

Nitrogen: The preferable range for the Nitrogen in the steel is about 0.0040 wt % to about 0.0050 wt %. Nitrogen combines with Titanium and Niobium to form nitrides/carbonitirdes. Accordingly, Ti/N ratio should be maintained at or less than (≥) 3.14 to limit the grain coarsening when material is subjected to end application process of SAW (submerged arc-welding) or ERW (electric resistance welding). However, increasing the nitrogen content above 0.010 wt % may lead to the embrittlement of the heat affected zone (HAZ) of weld joints.

Titanium: The preferable range of the Ti in the steel is about 0.020 wt % to about 0.025 wt %. Titanium in steel combines with Nitrogen to form TiN precipitates which inhibits the austenite grain coarsening when the steel is reheated prior to rolling. Also, the presence of TiN restricts the prior austenite grain coarsening in the heat affected zone, when the steel is subjected to the welding operation. This prevents the deterioration of toughness in the heat affected zone of the welded steel.

Aluminum: The preferable range of the Al in the steel is about 0.03 wt % to about 0.05 wt %. Aluminum in steel is used for de-oxidation of steel. The content of Al was limited to restrict the content of aluminum oxide, the presence of which deteriorates the hydrogen induced cracking resistance.

Sulphur: Sulphur needs to be limited to about 0.0010 wt % to avoid high level of MnS inclusions, as they cause severe deterioration of HIC properties.

Phosphorous: Phosphorus content should be restricted to a maximum of 0.015 wt % as higher phosphorus levels can lead to reduction in resistance to hydrogen induced cracking, toughness and weldability due to segregation of P at grain boundaries.

Calcium: The preferable range for the Ca in the steel is about 0.0020 to about 0.0050 wt %. Calcium treatment of steel is important to change the size and morphology of MnS inclusions. Ca/S ratio should be in a range of 2-3.

Thus, in preferred embodiments of the present disclosure, the composition of the present disclosure comprises C at a concentration ranging from about 0.02 wt % to about 0.04 wt %; Mn at a concentration ranging from about 0.7 wt % to about 1.0 wt %; Nb at a concentration ranging from about 0.07 wt % to about 0.08 wt %; Ti at a concentration ranging from about 0.020 wt % to about 0.025 wt %; Al at a concentration ranging from about 0.03 wt % to about 0.05 wt %; Si at a concentration ranging from about 0.2 wt % to about 0.4 wt %; N at a concentration ranging from about 0.0040 wt % to about 0.050 wt %; S at a concentration of about 0.0010%; and P at a concentration of about 0.010%. The said composition may also comprise Ca at a preferred concentration ranging from about 0.0020 to about 0.0050 wt %.

In another preferred embodiment of the present disclosure, the total micro alloying content of the composition is restricted to less than 0.20 wt %. Particularly, in the composition of the present disclosure, the cumulative concentration of Nb, Ti and N does not exceed 0.20 wt %.

This specific concentration of the components in the composition of the present disclosure lead to specific microstructure formation, that helps in providing the desired HIC properties to the steel. In embodiments of the present disclosure, the steel sheet according to the present disclosure has 90-95% ferrite. The ferrite is strengthened by solid solution strengthening contributions from Mn and Si. With the application of high Nb and controlled thermo-mechanical processing conditions, the average grain size is restricted to about 2.7 and 2.9 µm for coiling temperature of 500 and 600° C., respectively. This grain refinement significantly increases the strength of ferrite governed by the Hall-Petch relationship. Also, the finer grain size results in remarkable toughness of the steel at room temperature and at sub-zero temperatures. The dispersion of fine precipitates Niobium rich carbides, which are few nanometers in size, also contribute towards the strength of the ferrite. This can be seen from FIG. 4 which shows bright and dark field TEM micrographs revealing the dispersion of fine precipitates of niobium carbide/carbonitride for the steel coiled at 600° C. (as provided by example 1 below). Thus, in embodiments of the present disclosure, the steel having the said composition has average grain size ranging from about 2 µm to about 4 µm.

Accordingly, in embodiments of the present disclosure, the steel having the said composition has polygonal ferrite and bainitic ferrite microstructure. The amount of bainitic ferrite/acicular ferrite in the microstructure ranges between about 5% to about 10%. The strengthening from bainite/acicular ferrite is derived from its fine structure and higher dislocation density.

This microstructure, formed by the composition, lends enhanced strength and quality to the resultant steel of the present disclosure. More particularly, the steel of the present disclosure possesses high yield strength (YS) and ultimate tensile strength (UTS), as required by API 5L PSL-2 X65 specification. Thus, in embodiments of the present disclosure, the steel having the composition of the present disclosure has yield strength ranging from about 450 MPa to about 550 MPa; ultimate tensile strength (UTS) ranging from about 535 MPa to about 650 MPa; and elongation value of at least 25%. Accordingly, the YS/UTS ratio of the steel is also kept below 0.93.

In addition to YS and UTS, in embodiments of the present disclosure, the steel having the said composition has an impact toughness ranging from about 270 J to about 380 J at sub-zero temperature in longitudinal direction and about 260 J to about 370 J in transverse direction. Further, the steel also has a hardness value ranging from about 160 Hv to about 200 Hv and a fracture toughness (CTOD—crack tip opening displacement) value of at least 0.90.

As mentioned previously, the steel of the present disclosure has a ferrite potential of either less than 0.85 or greater than 1.05, thereby making the steel non-peritectic. This ferrite potential (FP) is calculated by the following empirical formula:

$$FP=2.5*(0.5-C_{eq}),$$

where $C_{eq}$ is carbon equivalence of the composition, and defined by the following equations:

$$Ceq=C+0.04*Mn+0.1*Ni+0.7*N-0.14*Si-0.04*Cr-0.1*Mo-0.24*Ti-0.7*S;$$

whereas the critical metal parameter (Pcm) for weld cracking is calculated by:

$$Pcm = C + \frac{Si}{30} + \frac{Mn}{20} + \frac{Cu}{20} + \frac{Ni}{60} + \frac{Cr}{20} + \frac{Mo}{20} + \frac{V}{10} + B$$

On the other hand, the formula based on International Institute of Welding (IIW) is:

$$CE = C + \frac{Mn}{6} + \frac{Cr + Mo + V}{5} + \frac{Cu + Ni}{15}$$

In embodiments of the present disclosure, the carbon equivalence of the composition is less than 0.35. Said carbon equivalence ensures that the steel exhibits excellent weldability during the process of tube manufacturing and other end applications.

Thus, it is a precise synergistic interplay of elements at specific concentrations, that allows the steel of the present disclosure to exhibit high resistance to HIC and tensile properties in accordance with the specifications laid down by API 5L PSL-2 for X-65 grade steel, and capable of being used for sour environment. Hence, while the developed steel is designed such that it is readily hot/cold formed, fire resistant and is welded to form linepipe tubes to be used for the transportation of natural gas or crude oil, it is also important to understand how the composition comes together to form the steel of the present disclosure.

The present disclosure thus also relate to the designing of the chemical composition of steel coupled with the controlled thermo-mechanical processing and accelerated cooling method to develop the line pipe steel grade conforming to API PSL-2 X-65 specification with excellent resistance to hydrogen induced cracking, superior low temperature toughness along with excellent weldability and formability.

Accordingly, the present disclosure provides a method for manufacturing steel having the composition as described above, said method comprising steps of:
 a. casting a steel slab with the steel composition of the present disclosure followed by heating the slab;
 b. controlled hot rolling of the slab with reduction below recrystallization stop temperature ($T_{NR}$) with pre-defined finish hot rolling temperature (FRT); and
 c. controlled cooling of the hot rolled steel sheet to a coiling temperature to obtain the said steel.

In embodiments of the present disclosure, the said method is carried out under specific conditions and parameters, which help achieve the desired steel of the present disclosure. Initially, the specified composition is first cast either through conventional continuous caster or a thin slab casting route. The non-peritectic steel composition of the present disclosure ensures smooth casting of steel through either route. After casting the slab with the specified composition, the slabs are reheated to a temperature greater than 1100° C. (preferably in the range of about 1100° C. to 1250° C.) for a duration of about 20 minutes to about 2 hours. The reheating temperature is above 1100° C. to ensure complete dissolution of any precipitates Niobium carbide/carbonitrides may have formed in the preceding processing steps. A reheating temperature greater than about 1250° C. is also undesirable as it may lead to grain coarsening of austenite and lead to yield loss due to excessive scale formation.

After casting and reheating the steel slab with the specified composition, hot-rolling of the slab is carried out. The hot rolling constitutes a roughing step above the recrystallization temperature and a finishing step below the recrystallization temperature, when rolling is done in a conventional hot strip mill. The recrystallization stop temperature ($T_{NR}$ in degree centigrade) is a critical parameter in defining the final microstructure of the developed steel in terms of grain size and second phase formation. The rolling is done with percentage reduction greater than about 70% to about 90% below $T_{NR}$ with specific finish rolling temperature (FRT). In some embodiments, where a CSP (compact strip processing)/TSCR (thin slab casting) is used for producing the steel (where there is no separate roughing mill) the deformation schedule should be designed in order to break the cast structure during the initial stands of hot rolling, and finishing must be done below the recrystallization temperature such that the percentage reduction below $T_{NR}$ is between about 70% to about 90% with FRT ranging from about $Ae_3$−50 (° C.) to about $Ae_3$+50 (° C.).

Thereafter, the hot rolled steel sheet is subjected to accelerated cooling strategy on the Run-Out-Table (ROT), at a cooling rate ranging from about 10° C./s to about 50° C./s to a coiling temperature (CT) ranging from about 520° C. to about 600° C., in order to suppress the pearlite formation and encourage the formation of bainitic ferrite or acicular ferrite in the microstructure. Higher coiling temperature of around 600° C. allows increase in the strength of steel by the precipitation of fine carbides in supersaturated ferrite.

FIG. 1 shows the schematic that defines the thermo-mechanical processing employed for the production of hot rolled strips of the designed chemistry used for manufacturing of X-65 sour grade.

Thus, the method for manufacturing steel having the composition as described herein comprises steps of:
 a. casting a steel slab with the steel composition of the present disclosure followed by heating the slab to a temperature ranging from about 1100° C. to about 1250° C.;
 b. hot rolling of the slab with about 70% to about 90% reduction below recrystallization stop temperature ($T_{NR}$) with finish hot rolling temperature (FRT) ranging from about $Ae_3$−50 (° C.) to about $Ae_3$+50 (° C.); and
 c. controlled cooling of the hot rolled steel sheet to a coiling temperature ranging from about 500° C. to about 600° C. to obtain the said steel.

In further embodiments of the present disclosure, the heating in step (a) of the method as aforementioned is carried out for a duration ranging from about 20 minutes to about 2 hours; and wherein the cooling in the step (c) is carried out at a rate ranging from about 10° C. to about 50° C. per second.

In an embodiment, the foregoing descriptive matter is illustrative of the disclosure and not a limitation. While considerable emphasis has been placed herein on the particular features of this disclosure, it will be appreciated that various modifications can be made, and that many changes can be made in the preferred embodiments without departing from the principles of the disclosure. Those skilled in the art will recognize that the embodiments herein can be practiced with modification within the spirit and scope of the embodiments as described herein.

EXAMPLES

Example 1: Manufacturing of Steel of the Present Disclosure and Analysis of the Microstructure Thereof Steel with composition as defined in Table 1 below was cast into two billets. The cast billets were then reheated to a temperature of 1200° C. for a period of 1 hour to ensure the complete dissolution of Niobium precipitates. Both the billets were hot rolled with the identical deformation schedule, with the 78% reduction below $T_{NR}$ (1030-1040° C.) and finish rolled to a temperature of 870° C. Post hot rolling, the two hot rolled sheets processed from the two billets were cooled to a coiling temperature of 500° C. and 600° C., respectively at cooling rate of 25-30° C./s.

TABLE 1

| Elements/Properties | Concentrations (wt %)/Values |
|---|---|
| C | 0.04 |
| Mn | 0.80 |
| Si | 0.30 |
| Nb | 0.08 |
| Ti | 0.020 |
| Al | 0.04 |
| S | <0.0010 |
| P | 0.005 |
| N | 0.0040 |
| Ferrite Potential (Fp) | 1.18 |
| Pcm | 0.10 |
| C (IIW) | 0.19 |
| Total Micro alloying content (Nb + Ti + N) | 0.104 |

The resulting hot rolled sheets coiled at 500° C. and 600° C. are analysed for their microstructure details, grain sizes and hardness values, and the results are provided in Table 2 below:

TABLE 2

Microstructural details

| Coiling Temperature (CT) | Microstructure | Average Grain size (μm) | Hardness ($H_v$) |
|---|---|---|---|
| 500° C. | Ferrite + Bainitic ferrite | 2.70 | 170 ± 6 |
| 600° C. | Ferrite | 2.90 | 174 ± 5 |

Results: For both cases of steel coiled at 500° C. and 600° C., the microstructure, grain size and hardness correspond to the values required by the steel of the present disclosure.

While, FIG. 2 provides optical (2a) and SEM micrograph (2b) showing the ferrite-bainite microstructure of steel coiled at 500° C.; FIG. 3 provides optical (3a) and SEM micrograph (3b) showing predominantly polygonal ferrite with acicular or bainitic ferrite microstructure of steel coiled at 600° C.

Further, while FIG. 4 shows bright and dark field TEM micrographs revealing the dispersion of fine precipitates of niobium carbide/carbonitride for the steel coiled at 600° C., FIG. 5 shows bright field TEM micrographs showing the fine bainitic ferrite/acicular ferrite microstructure for the steel coiled at 500° C.

Example 2: Analysis of the Tensile Properties of Steel of the Present Disclosure Steel with composition and process details as defined in Example 1 was manufactured, and the resulting hot rolled sheets coiled at 500° C. and 600° C. are analysed for their yield strength (YS), ultimate tensile strength (UTS), % Elongation and YS/UTS ratio, and the results are provided in Table 3 below:

TABLE 3

Tensile properties of hot rolled sheets

| | CT 500° C. | CT 600° C. |
|---|---|---|
| YS (MPa) | 485 | 537 |
| UTS (MPa) | 545 | 600 |
| % Elongation | 32 | 29 |
| (YS/UTS) Ratio | 0.89 | 0.89 |

Results: For both cases of steel coiled at 500° C. and 600° C., the tensile properties correspond to the values required by the steel of the present disclosure, and as per the API 5L PSL-2 X65 specification.

Example 3: Analysis of the Impact Toughness of Steel of the Present Disclosure

Steel with composition and process details as defined in Example 1 was manufactured, and the resulting hot rolled sheets coiled at 500° C. and 600° C. are analysed for their impact toughness, and the results are provided in Table 4 below:

TABLE 4

Impact toughness of hot rolled strips coiled at 500° C. and 600° C.

| | Impact Toughness (In Joules) | | | |
|---|---|---|---|---|
| | CT-500° C. | | CT-600° C. | |
| Temperature | Longitudinal | Transverse | Longitudinal | Transverse |
| 25° C. | 404 | 400 | 376 | 360 |
| 0° C. | 390 | 385 | 355 | 350 |
| −40° C. | 385 | 354 | 345 | 300 |
| −60° C. | 365 | 350 | 280 | 260 |

Results: For both cases of steel coiled at 500° C. and 600° C., the impact toughness was found to be ranging between 270 J to 380 J at −60° C. in longitudinal direction and 260 J to 370 J in transverse direction, as required by the steel of the present disclosure.

Example 4: Analysis of the Tensile Properties of Steel of the Present Disclosure Steel with composition and process details as defined in Example 1 was manufactured, and the resulting hot rolled sheets coiled at 500° C. and 600° C. are analysed for their fracture toughness (CTOD), at room temperature and sub-zero temperature, and the results are provided in Table 5 below:

TABLE 5

Fracture toughness of steels coiled at 500 and 600° C.

| | Fracture Toughness CTOD (mm) | |
|---|---|---|
| | CT-500° C. | CT-600° C. |
| Room Temperature | 1.07 | 1.00 |
| 0° C. | 1.12 | 1.02 |
| −40° C. | 1.07 | 0.95 |

Results: For both cases of steel coiled at 500° C. and 600° C., the fracture toughness was found to be greater than 0.90, as required by the steel of the present disclosure.

Example 5: Analysis of the Hydrogen Induced Cracking (HIC) Properties of Steel of the Present Disclosure Steel with composition and process details as defined in Example 1 was manufactured, and the resulting hot rolled sheets coiled at 500° C. and 600° C. are tested as per NACE standard TM0284-2005, for their HIC properties. The standard samples of 100*20*T (where T is the thickness of hot rolled strip) were exposed to a test solution comprising of 0.5% acetic acid and 5% sodium chloride dissolved in distilled water with pH of 3±0.5, saturated with $H_2S$ under a positive pressure for a period of 96 hours.

After the test, exposed samples were polished and subjected to metallography examination for the cracks generated in the sample. The performance of steel against HIC is expressed in terms of three parameters—CLR, CTR and CSR (as defined previously). Said results are provided in Table 6 below.

TABLE 6

HIC properties of developed steel

| Index | CT-500° C. | CT-600° C. |
|---|---|---|
| Crack Length Ratio (CLR) | 0 | 0 |
| Crack Thickness Ratio (CTR) | 0 | 0 |
| Crack Sensitivity Ratio (CSR) | 0 | 0 |

Results: For both cases of steel coiled at 500° C. and 600° C., no cracks were generated and all the three parameters CLR, CTR and CSR were found to be zero for the developed steel.

Example 6: Analysis of Elemental Distribution of Steel of the Present Disclosure Steel with composition and process details as defined in Example 1 was manufactured, and the resulting hot rolled sheets are analysed for distribution of Carbon and Manganese therein. As is observed from FIG. 6, there is a uniform distribution of Carbon and Manganese in the mid thickness region of hot rolled steel. This is accomplished due to the specific composition of the present disclosure, employed to obtain the steel herein.

Additional embodiments and features of the present disclosure will be apparent to one of ordinary skill in art based on the description provided herein. The embodiments herein provide various features and advantageous details thereof in the description. Descriptions of well-known/conventional methods and techniques are omitted so as to not unnecessarily obscure the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments in this disclosure have been described in terms of preferred embodiments, those skilled in the art will recognize that the embodiments herein can be practiced with modification within the spirit and scope of the embodiments as described herein.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Throughout this specification, the word "comprise", or variations such as "comprises" or "comprising" wherever used, will be understood to imply the inclusion of a stated element, integer or step, or group of elements, integers or steps, but not the exclusion of any other element, integer or step, or group of elements, integers or steps.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

We claim:

1. A steel comprising:
carbon (C) at a concentration ranging from about 0.02 wt % to about 0.06 wt %; manganese (Mn) at a concentration ranging from about 0.7 wt % to about 1.0 wt %; niobium (Nb) at a concentration ranging from about 0.06 wt % to about 0.10 wt %; titanium (Ti) at a concentration ranging from about 0.015 wt % to about 0.025 wt %; aluminium (Al) at a concentration ranging from about 0.03 wt % to about 0.10 wt %; silicon (Si) at a concentration ranging from about 0.1 wt % to about 0.5 wt %; nitrogen (N) at a concentration ranging from about 0.0001 wt % to about 0.0060 wt %; sulphur (S) at a concentration ranging from about 0.0001 wt % to about 0.0020 wt %; and phosphorus (P) at a concentration ranging from about 0.0001 wt % to about 0.015 wt %, as elements, wherein vanadium (V), chromium (Cr), boron (B), copper (Cu), and molybdenum (Mo) are not present in the steel, wherein the steel exhibits a crack length ratio (CLR) of less than 10%, a crack thickness ratio (CTR) of less than 5%, a crack sensitivity ratio (CSR) of less than 2%, and a ferrite potential of less than 0.85 or more than 1.05, wherein the CLR, the CSR and the CTR are measured according to National Association of Corrosion Engineers (NACE) standard TM0284-2005, and wherein a structure of the steel consists of polygonal ferrite and at least one microstructure selected from the group consisting of a bainitic ferrite and an acicular ferrite microstructure.

2. The steel as claimed in claim 1, wherein the steel is non-peritectic, conforms to American Petroleum Institute API 5L Product Standard Level (PSL)-2 X65 specification, and provides resistance to hydrogen induced cracking (HIC).

3. The steel as claimed in claim 1, wherein a carbon equivalence of the steel is less than 0.35.

4. The steel as claimed in claim 1, wherein a cumulative concentration of Nb, Ti and N in the steel does not exceed 0.20 wt % relative to the steel.

5. The steel as claimed in claim 1, wherein
the steel has a yield strength (YS) ranging from about 450 MPa to about 550 MPa, an ultimate tensile strength (UTS) ranging from about 535 MPa to about 650 MPa, and elongation value of at least 25%.

6. The steel as claimed in claim 1, wherein the steel has an average grain size ranging from about 2 μm to about 4 μm.

7. The steel as claimed in claim 1, wherein the steel has an impact toughness ranging from about 270 J to about 380 J at sub-zero Celsius temperature in a longitudinal direction and about 260 J to about 370 J in a transverse direction.

8. The steel as claimed in claim 1, wherein the steel has a hardness value ranging from about 160 $H_v$ to about 200 $H_v$.

9. The steel as claimed in claim 1, wherein the steel has a fracture toughness (CTOD—crack tip opening displacement) value of at least 0.90.

10. The steel as claimed in claim 1, wherein the steel is a linepipe steel, employed for an application in a service environment that is non-sour grade, wherein the non-sour grade is a sulphur content in a range of 0.5% or less.

11. A method for manufacturing the steel as claimed in claim 1, the method comprising:
   a. casting a steel slab comprising the elements in the steel of claim 1 followed by heating the slab to a temperature ranging from about 1100° C. to about 1250° C.;
   b. hot rolling of the slab with about 70% to about 90% reduction below recrystallization stop temperature ($T_{NR}$) with finish hot rolling temperature ranging from about $Ae_3$−50 (° C.) to about $Ae_3$+50 (° C.) so as to form a hot rolled sheet; and
   c. controlled cooling of the hot rolled steel sheet resulting from the hot rolling (b) to a coiling temperature ranging from about 500° C. to about 600° C. so as to obtain said steel so that a structure of the steel consists of the polygonal ferrite and the at least one microstructure selected from the group consisting of the bainitic ferrite and the acicular ferrite microstructure.

12. The method as claimed in claim 11,
wherein the heating in the casting the steel slab (a) is carried out for a duration ranging from about 20 minutes to about 2 hours; and
wherein the cooling (c) is carried out at a rate ranging from about 10° C. to about 50° C. per second.

13. A steel having a microstructure consisting of polygonal ferrite and at least one of bainitic ferrite and acicular ferrite microstructure, wherein an amount of the polygonal ferrite is in a range from 90% to 95% and the amount of least one of bainitic ferrite and acicular ferrite is in a range from 5% to 10%, wherein the steel is prepared by a method comprising:
   a. casting a steel slab comprising the elements in the steel of claim 1 followed by heating the slab to a temperature ranging from about 1100° C. to about 1250° C.;
   b. hot rolling of the slab with about 70% to about 90% reduction below recrystallization stop temperature ($T_{NR}$) with finish hot rolling temperature ranging from about $Ae_3$−50 (° C.) to about $Ae_3$+50 (° C.) so as to form a hot rolled sheet; and
   c. controlled cooling of the hot rolled steel sheet resulting from the hot rolling (b) to a coiling temperature ranging from about 500° C. to about 600° C. so as to obtain said steel, and
wherein the steel composition comprises:
carbon (C) at a concentration ranging from about 0.02 wt % to about 0.06 wt %; manganese (Mn) at a concentration ranging from about 0.7 wt % to about 1.0 wt %; niobium (Nb) at a concentration ranging from about 0.06 wt % to about 0.10 wt %; titanium (Ti) at a concentration ranging from about 0.015 wt % to about 0.025 wt %; aluminium (Al) at a concentration ranging from about 0.03 wt % to about 0.10 wt %; silicon (Si) at a concentration ranging from about 0.1 wt % to about 0.5 wt %; nitrogen (N) at a concentration ranging from about 0.0001 wt % to about 0.0060 wt %; sulfur(S) at a concentration ranging from about 0.0001 wt % to about 0.0020 wt %; nd
phosphorus (P) at a concentration ranging from about 0.0001 wt % to about 0.015 wt %, as elements, and
wherein vanadium (V), chromium (Cr), boron (B), copper (Cu), and molybdenum (Mo) are not present in the steel.

* * * * *